(12) United States Patent
Dantzig et al.

(10) Patent No.: US 8,850,127 B2
(45) Date of Patent: Sep. 30, 2014

(54) MANAGING CONCURRENT ACCESSES TO A CACHE

(71) Applicant: International Business Machines Corporation, Armonk, NY (US)

(72) Inventors: Paul M. Dantzig, Scarsdale, NY (US);
Robert O. Dryfoos, Hopewell Junction, NY (US); Sastry S. Duri, Yorktown Heights, NY (US); Arun Iyengar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/227,398

(22) Filed: Mar. 27, 2014

(65) Prior Publication Data

US 2014/0215159 A1  Jul. 31, 2014

Related U.S. Application Data

(60) Division of application No. 13/925,356, filed on Jun. 24, 2013, which is a continuation of application No. 12/888,883, filed on Sep. 23, 2010, now abandoned.

(51) Int. Cl.
*G06F 12/00* (2006.01)
*G06F 12/08* (2006.01)

(52) U.S. Cl.
CPC .................................. *G06F 12/084* (2013.01)
USPC ........... 711/147; 711/119; 711/150; 711/216; 718/102; 719/312; 719/313; 719/317; 719/330

(58) Field of Classification Search
None
See application file for complete search history.

(56) References Cited

U.S. PATENT DOCUMENTS

| | | | |
|---|---|---|---|
| 6,115,802 A | 9/2000 | Tock et al. | |
| 6,823,511 B1 * | 11/2004 | McKenney et al. | 718/102 |
| 7,533,138 B1 | 5/2009 | Martin | |
| 7,668,851 B2 | 2/2010 | Triplett | |
| 8,489,821 B2 | 7/2013 | Dantzig et al. | 711/144 |
| 8,688,925 B2 * | 4/2014 | Lankreijer | 711/154 |
| 2008/0033952 A1 | 2/2008 | McKenney et al. | |
| 2009/0240894 A1 | 9/2009 | George et al. | |
| 2010/0023707 A1 | 1/2010 | Hohmuth et al. | |

OTHER PUBLICATIONS

Michael, M. M., "High Performance Dynamic Lock-Free Hash Tablos and List-Based Sets", Proceedings of the fourteenth annual ACM symposium on parallel algorithms and architectures, (2002), 73-82, Sections 2 and 3.

(Continued)

*Primary Examiner* — Shawn X Gu
(74) *Attorney, Agent, or Firm* — Thomas Grzesik; Fleit Gibbons Gutman Bongini & Bianco PL

(57) ABSTRACT

Various embodiments of the present invention allow concurrent accesses to a cache. A request to update an object stored in a cache is received. A first data structure comprising a new value for the object is created in response to receiving the request. A cache pointer is atomically modified to point to the first data structure. A second data structure comprising an old value for the cached object is maintained until a process, which holds a pointer to the old value of the cached object, at least one of one of ends and indicates that the old value is no longer needed.

20 Claims, 8 Drawing Sheets

(56) References Cited

OTHER PUBLICATIONS

Valois, J. D., "Lock-Free Linked Lists Using Compare-and-Swap", Proceedings of the fourteenth annual ACM symposium on Principles of distributed computing, (1995), pp. 214-222, sections 3 and 4.1.

Michael, M. M., "Safe Memory Reclamation for Dynamic Lock-Free Objects Using Atomic Reads and Writes", Proceedings of the twenty-first annual symposium on principles of distributed computing (2002), pp. 21-30, sections 2 & 3, List-Based Sets.

Herlihy, M. et al., "Transactional Memory: Architectural Support for Lock-Free Data Structures", ACM SIGARCH Computer Architecture News, (May 1993), 21(2), 289-300.

Barnes, G., "A Method for Implementing Lock-Free Shared Data Structures", Proceedings of the fifth annual ACM symposium on Parallel algorithms and architectures, (1993), pp. 261-270, section 3.

* cited by examiner

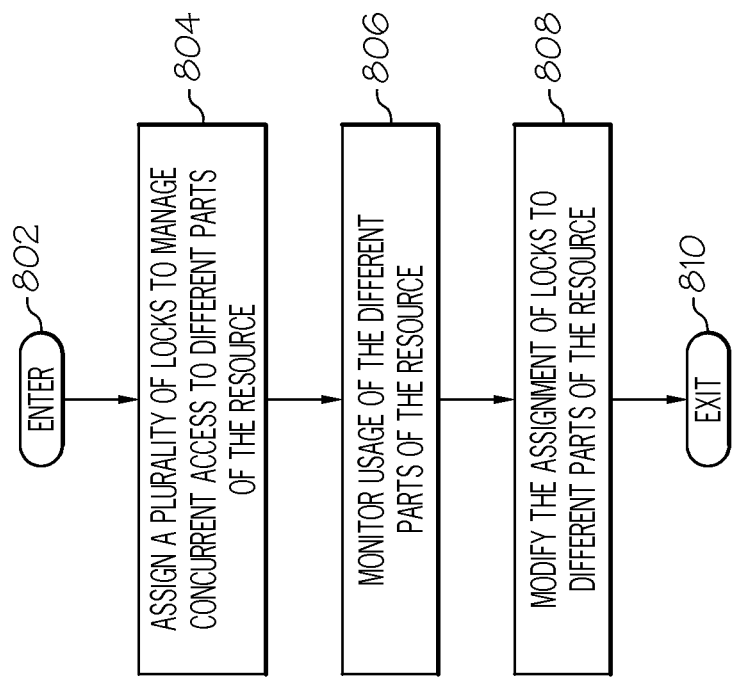

US 8,850,127 B2

MANAGING CONCURRENT ACCESSES TO A CACHE

CROSS-REFERENCE TO RELATED APPLICATIONS

This application is a divisional application of and claims priority from U.S. patent application Ser. No. 13/925,356, filed on Jun. 24, 2013, which is a continuation application of and claims priority from U.S. patent application Ser. No. 12/888,883, filed on Sep. 23, 2010, the entire disclosures of which are herein incorporated by reference in its entirety.

FIELD OF THE INVENTION

The present invention generally relates to computer memory management, and more particularly relates to a shared memory architecture.

BACKGROUND OF THE INVENTION

Caching is used to improve performance in a wide variety of computer systems. Caching allows data to be replicated close to a client. This helps the client avoid having to fetch the object from a remote node, persistent storage, or the like, for which the overhead to access the data would be high. However, with respect to multiple processes executing in the same node trying to access the same data, existing caches are generally inefficient. One existing solution is for each process to have its own cache. Therefore, n caches are required for n processes, one for each process potentially resulting in n copies of a cached object. This space overhead is a significant drawback. Another problem is that with multiple copies, consistency among the multiple copies needs to be maintained. This adds further complications and overhead. Another existing solution is to have a cache process $C_1$ communicating with $P_1, P_2, \ldots P_n$. A process $P_i$ accesses the cache by communicating with $C_1$. However, this inter-process communication also incurs unnecessary overhead as well.

SUMMARY OF THE INVENTION

In one embodiment, an information processing system for allowing concurrent accesses to a cache is disclosed. The information processing system comprises a memory and a processor. The processor is configured to perform a method. The method comprises receiving a request to update an object stored in a cache. A first data structure comprising a new value for the object is created in response to receiving the request. A cache pointer is atomically modified to point to the first data structure. A second data structure comprising an old value for the cached object is maintained until a process, which holds a pointer to the old value of the cached object, at least one of one of ends and indicates that the old value is no longer needed.

In another embodiment, a computer program product for allowing concurrent accesses to a cache is disclosed. The computer program product comprises a storage medium readable by a processing circuit and storing instructions for execution by the processing circuit for performing a method. The method comprises receiving a request to update an object stored in a cache. A first data structure comprising a new value for the object is created in response to receiving the request. A cache pointer is atomically modified to point to the first data structure. A second data structure comprising an old value for the cached object is maintained until a process, which holds a pointer to the old value of the cached object, at least one of one of ends and indicates that the old value is no longer needed.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 8 is an operational flow diagram illustrating one example of managing concurrent accesses to a resource in a parallel computing environment according to one embodiment of the present invention.

DETAILED DESCRIPTION

As required, various detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one as or more than one. The term plurality, as used herein, is defined as two as or more than two. Plural and singular terms are the same unless expressly stated otherwise. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 1:
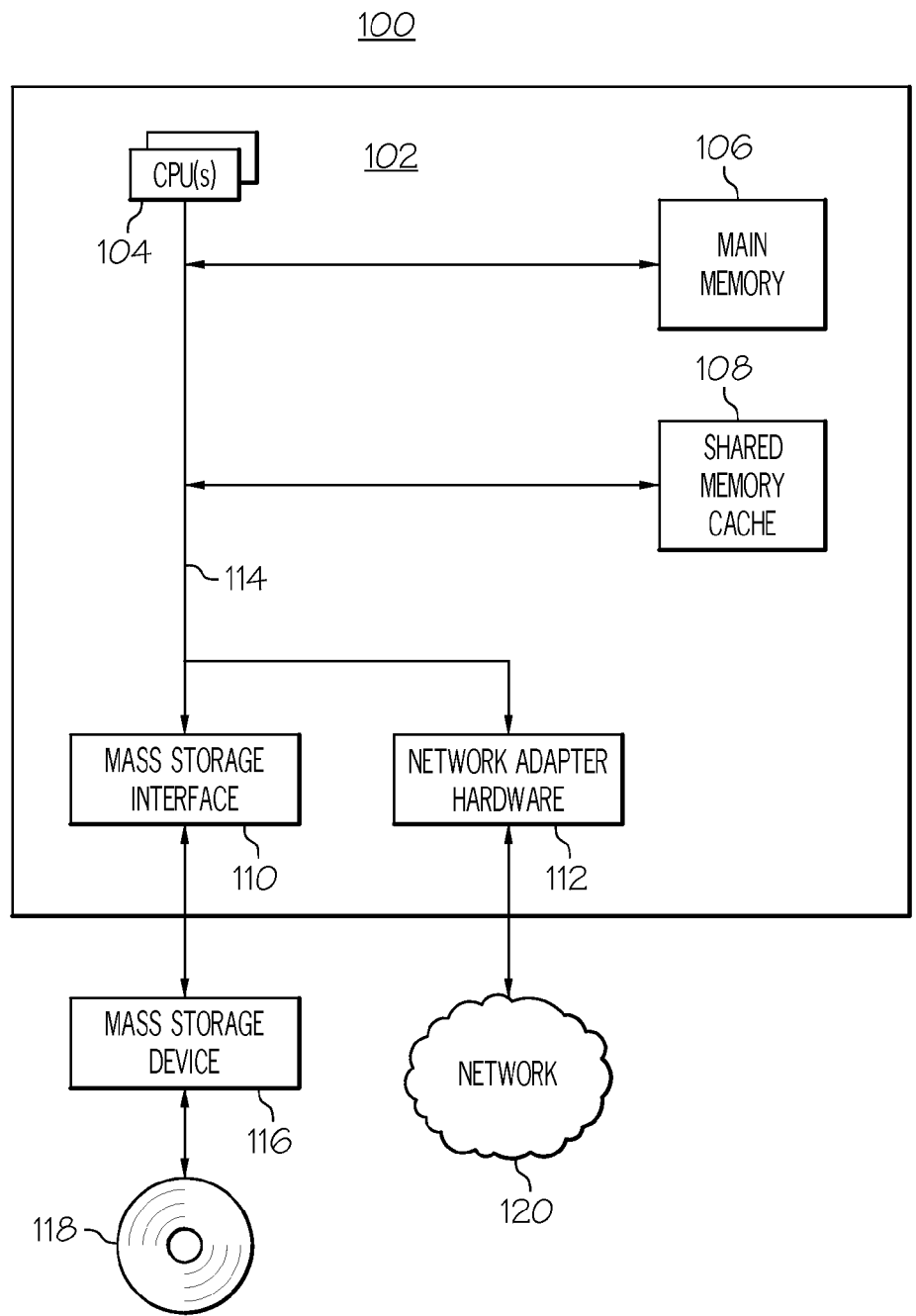
FIG. 1 is a block diagram illustrating one example of an operating environment according to one embodiment of the present invention.

FIG. 1 shows an exemplary operating environment applicable to various embodiments of the present invention. In particular, FIG. 1 shows an information processing system 100 that is based upon a suitably configured processing system adapted to implement one or more embodiments of the present invention. Similarly, any suitably configured processing system can be used as the information processing system 100 by various embodiments of the present invention. The system 100 can be a standalone system or reside within a multi-system environment such as a parallel-distributing environment.

The information processing system 100 includes a computer 102. The computer 102 has a processor(s) 104 that is connected to a main memory 106, a shared memory cache 108, a mass storage interface 110, and network adapter hardware 112. A system bus 114 interconnects these system components. The shared memory cache 108 is discussed in greater detail below. In one embodiment, the information processing system 100 utilizes conventional virtual addressing mechanisms to allow programs to behave as if they have access to a large, single storage entity, referred to herein as a computer system memory, instead of access to multiple, smaller storage entities such as the main memory 106 and mass storage device 116. Note that the term "computer system memory" is used herein to generically refer to the entire virtual memory of the information processing system 100.

The mass storage interface 110 is used to connect mass storage devices, such as mass storage device 116, to the information processing system 100. One specific type of data storage device is an optical drive such as a CD/DVD drive, which may be used to store data to and read data from a computer readable medium or storage product such as (but not limited to) a CD/DVD 118. Another type of data storage device is a data storage device configured to support, for example, NTFS type file system operations.

Although only one CPU 104 is illustrated for computer 102, computer systems with multiple CPUs can be used equally effectively. Various embodiments of the present invention further incorporate interfaces that each includes separate, fully programmed microprocessors that are used to off-load processing from the CPU 104. An operating system (not shown) included in the main memory is a suitable multitasking operating system such as any of the Linux, UNIX, Windows, and Windows Server based operating systems. Various embodiments of the present invention are able to use any other suitable operating system. Some embodiments of the present invention utilize architectures, such as an object oriented framework mechanism, that allows instructions of the components of operating system (not shown) to be executed on any processor located within the information processing system 100. The network adapter hardware 112 is used to provide an interface to a network 120. Various embodiments of the present invention are able to be adapted to work with any data communications connections including present day analog and/or digital techniques or via a future networking mechanism.

Figure 2:
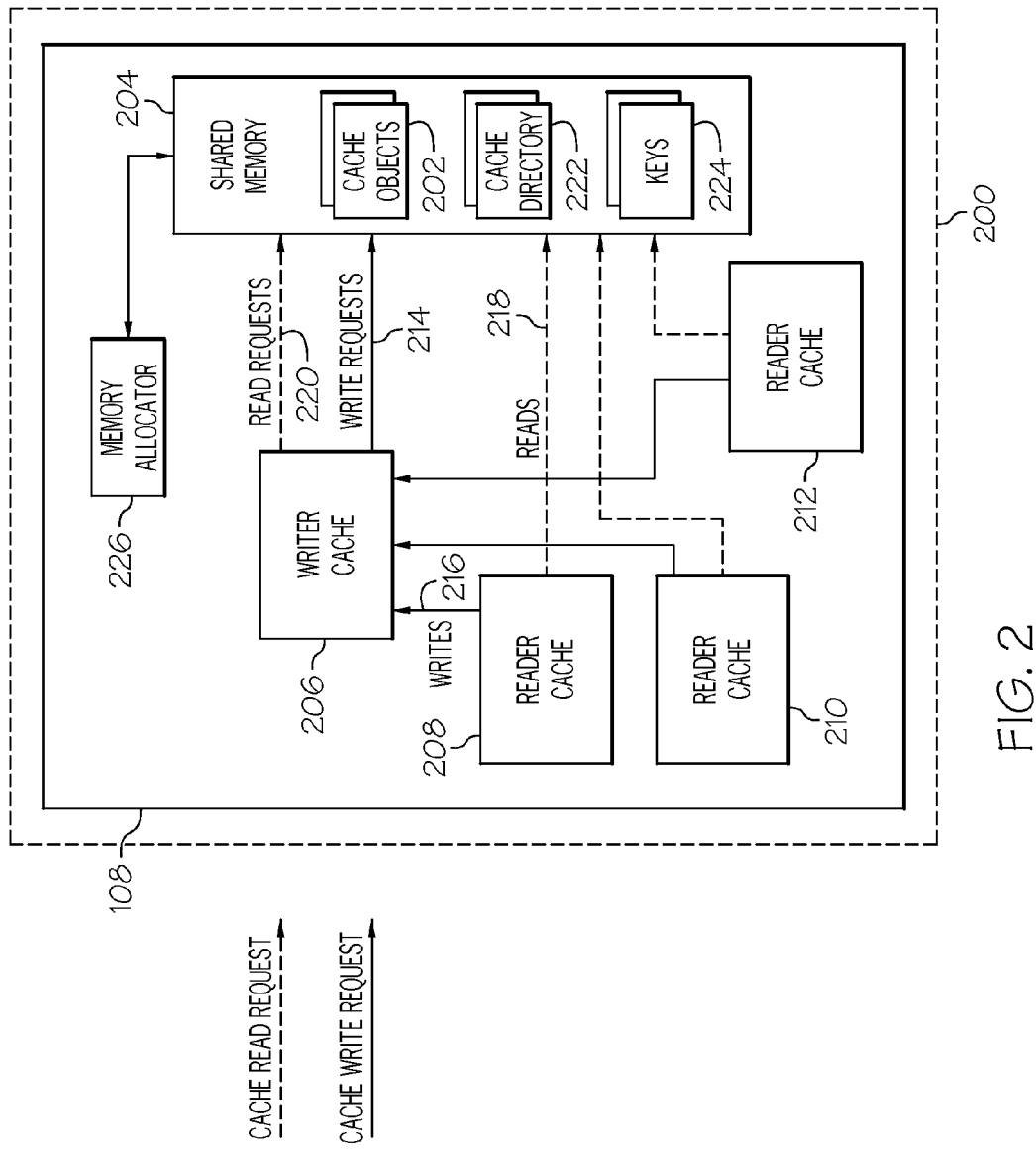
FIG. 2 is a block diagram showing one example of a shared memory cache architecture according to one embodiment of the present invention.

FIG. 2 illustrates one example of an architecture of the shared memory cache 108 according to one embodiment of the present invention. The dashed boxed 200 represents a system (i.e., hardware and software that implements the shared memory cache architecture of FIG. 2. In one embodiment, cached objects 202 are stored in a shared memory 204. The shared memory 204 is accessible by any process running on the same node comprising the shared memory 204. A writer cache 206, which performs updates to the shared memory 204, is communicatively coupled to the shared memory 204. One or more reader caches 208, 210, 212 are also communicatively coupled to the shared memory 204 and to the writer cache 206 as well. Reader caches 208, 210, 212 can directly access the shared memory 204 to read cached data (i.e., cache objects 202). In order to update cached data, however, a reader cache 208, 210, 212 communicates with the writer cache 206 to perform the updates. For example, the reader cache 208, 210, 212 sends a set of update information associated with the cached data 202 to the writer cache 206. The writer cache 206 then updates the cached data 202 based on the set of update information.

FIG. 2 also shows a plurality of arrows. Solid arrows 214, 216 represent cache write requests. Dashed arrows 218, 220 represent read requests. As can be seen, read requests can go directly from a reader cache 208, 210, 212 to the shared memory 204. Write requests from a reader cache 208, 210, 212 go to the writer cache 206. Because a reader cache 208, 210, 212 can directly access the shared memory 204 for reads, this results in increased performance. Also, because all updates go through the write cache 206, the write cache 206 controls updates so that they are made in a consistent fashion.

Figure 3:
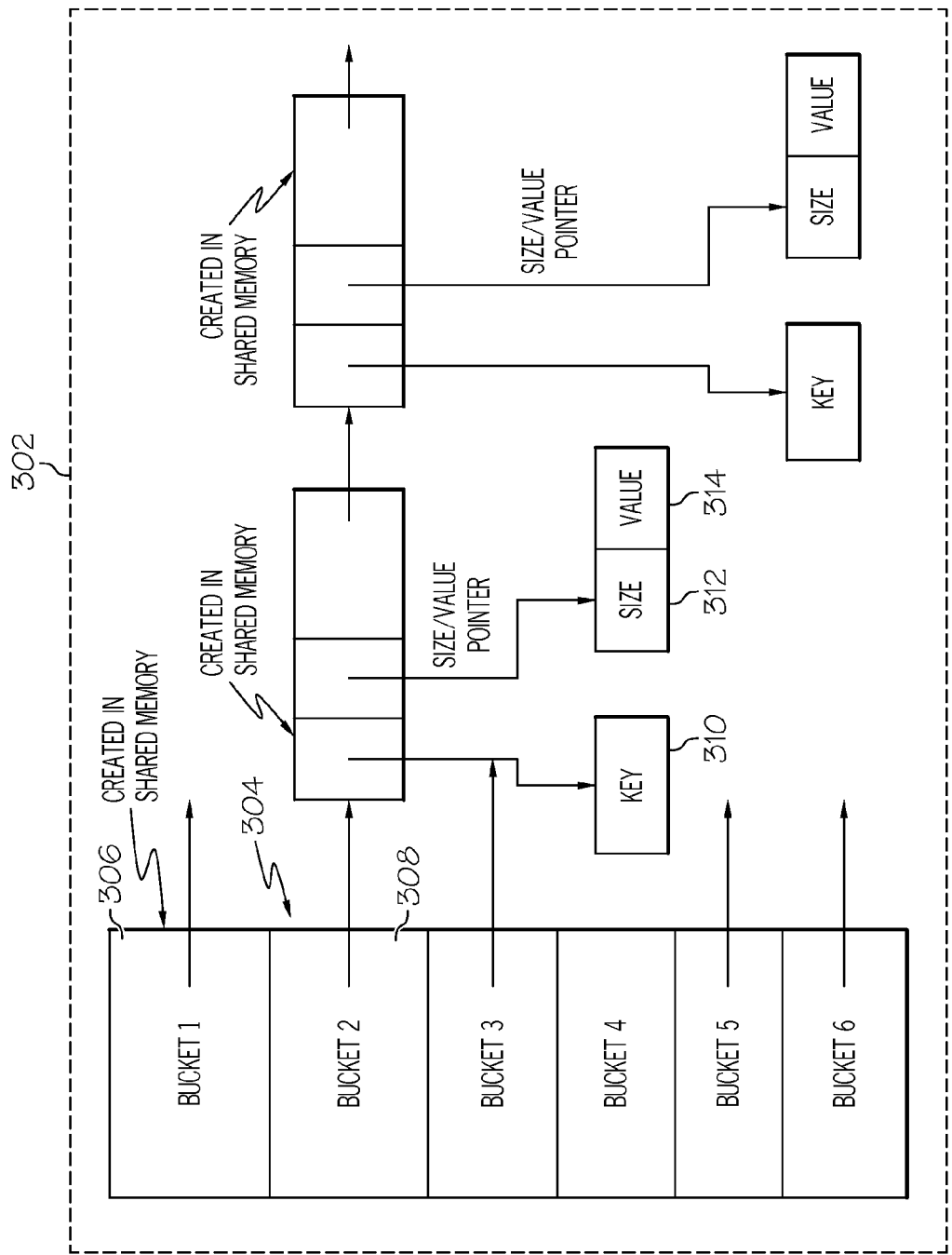
FIG. 3 illustrates one example of a shared memory cache architecture according to one embodiment of the present invention of the present invention.

In one embodiment, a cache directory 222 is maintained in the shared memory 204. Also, the memory for storing cache keys 224 and cache data is also maintained in the shared memory 204. It should be noted that the cache keys 224 can also be stored within the cache directory 222 as well, as shown in FIG. 3. The cache directory 222 allows cache objects to be located in the shared memory 204. The cache directory 222 uses the cache keys 224 to identify the location where the cached objects 202 are stored. The key can be a text string, a byte stream, or the like. A wide variety of implementations can be used for maintaining a cache directory. For example, hash tables can be used for cache directories. However, many other data structures can be used within the spirit and scope of one or more embodiments including, but not limited to, balanced trees, lists, or the like. A memory allocator 228 can be used for managing the space within the shared memory 204. The memory allocator 228 is both fast and uses memory space efficiently (without wasting much memory).

FIG. 3 is a block diagram illustrating a more detailed view of data structures within the shared memory 204 according to one embodiment. It should be noted that other data structures are also possible as well and the example shown in FIG. 3 does not limit the present invention in any way. In one embodiment, the shared memory 204 can be implemented using shared segments (such as POSIX shared segments) that use the function calls such as shmget and shmat. These particular function calls are discussed in greater at "[[http://linux.about.com/library/cmd/blcmdl2_shmget.htm]]; [[http://linux.die.net/man/2/shmget]]; and [[http://www.opengroup.org/onlinepubs/009695399/functions/shmget.html]], which are hereby incorporated by reference in their entireties.

When shared segments are used to implement the shared memory 204, references to objects within a shared segment could preferably be relative addresses (i.e., an offset added to a base). Therefore, the references are calculated correctly regardless of where the system attaches a shared memory segment within the address space of a process. The base for calculating relative addresses depends on where the shared segment is attached within the address space of a process.

FIG. 3 shows a hash table 302 stored within the shared memory 204. Addresses within this hash table are given as an offset relative to a base (i.e. relative addresses). Absolute addresses are determined by adding the offset to a base. Hash tables are comprised of a plurality of buckets 304. A bucket 306 stores 0 or more cached objects 202. If there are multiple cached objects 202 within a bucket (which is the case for Bucket 2 308), the multiple objects can be stored using a linked list. In FIG. 3, the data corresponding to a cached object 202 includes its key 310, the size 312 of the data, and the data itself 314. The memory for storing these various items is efficiently managed by the memory allocator 228.

One of the key issues in designing this type of a cache is how to prevent parallel updates from creating inconsistent versions of cached data. Various embodiments of the present invention overcome this problem by having all updates go through the cache writer 206; a cache reader 208, 210, 212 is not allowed to update cached data without going through the cache writer 206. Furthermore, the cache writer 206 can be implemented as a single process using techniques such as mutexes, semaphores, and/or the like to prevent concurrent updates to the same cached objects from taking place. However, another problem is that a cache writer updates a part of the cache that a cache reader is trying to access. The problem here is that a cache writer might be updating a part of the that a reader is concurrently trying to read. This can result in the reader seeing inconsistent results. One or more embodiments also overcome this problem as well.

For example, one approach is to utilize locks. If a process has an exclusive lock on an object, it knows that no other process is currently reading the object or attempting to update the object. The process can then go ahead and perform the update knowing that it will not adversely affect other processes. However, a problem with using locks is that they incur significant overhead. If many exclusive locks are being obtained, this can significantly reduce the number of cache operations that can take place at a time, seriously reducing performance. Another problem is that locks have significant overhead themselves. In many cases, it may be desirable to limit the number of locks due to the overhead that each lock imposes on the system; there may be a maximum number of locks that a system will allow. Yet another drawback to using locks is that the system can become deadlocked and stop operating if the locking protocol is not adequately designed.

Therefore, one or more embodiments alleviate these problems caused by locks. For example, one embodiment achieves updates to the cache without requiring the use of locks. Another embodiment allows a limited number of locks to be used so that system overhead due to using a high number of locks is not incurred. One or more of these embodiments are applicable to caches implemented using at least one of volatile memory (DRAM, SRAM, etc) and non-volatile memory (e.g. disks, CDs, DVDs, tapes, etc). One or more of these embodiments are also applicable to caches implemented using a combination of volatile and nonvolatile memory. For example, in one embodiment, the shared memory cache 108 of FIG. 2 can comprise volatile memory, non-volatile memory, and/or a combination of both.

Figure 4:
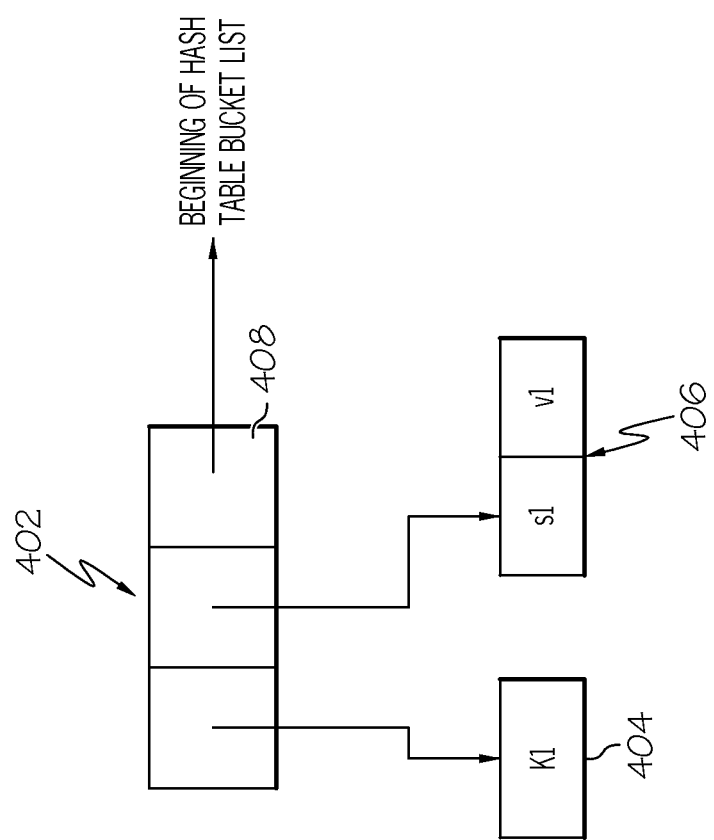
FIG. 4 illustrates a data structure created for a new object to be added to the shared memory cache of FIG. 2 according to one embodiment of the present invention.

With respect to the embodiment that achieves updates to the cache without requiring the use of locks consider a new object $O_1$ that is to be added to the shared memory 204. The correct bucket for the object needs to be determined. Hash table buckets are comprised of linked lists that point to the keys and values of objects. A new list item 402, data structure 404 comprising the key, and data structure 406 comprising the size and value of the data for $O_1$ needs to be created, as shown in FIG. 4. The writer cache 206 creates and initializes these data structures without locking them. While it is doing so, none of the reader caches 208, 210, 212 have access to these data structures 404, 406. Therefore, there is no need for the writer cache 206 to lock these data structures 404, 406.

Figure 5:
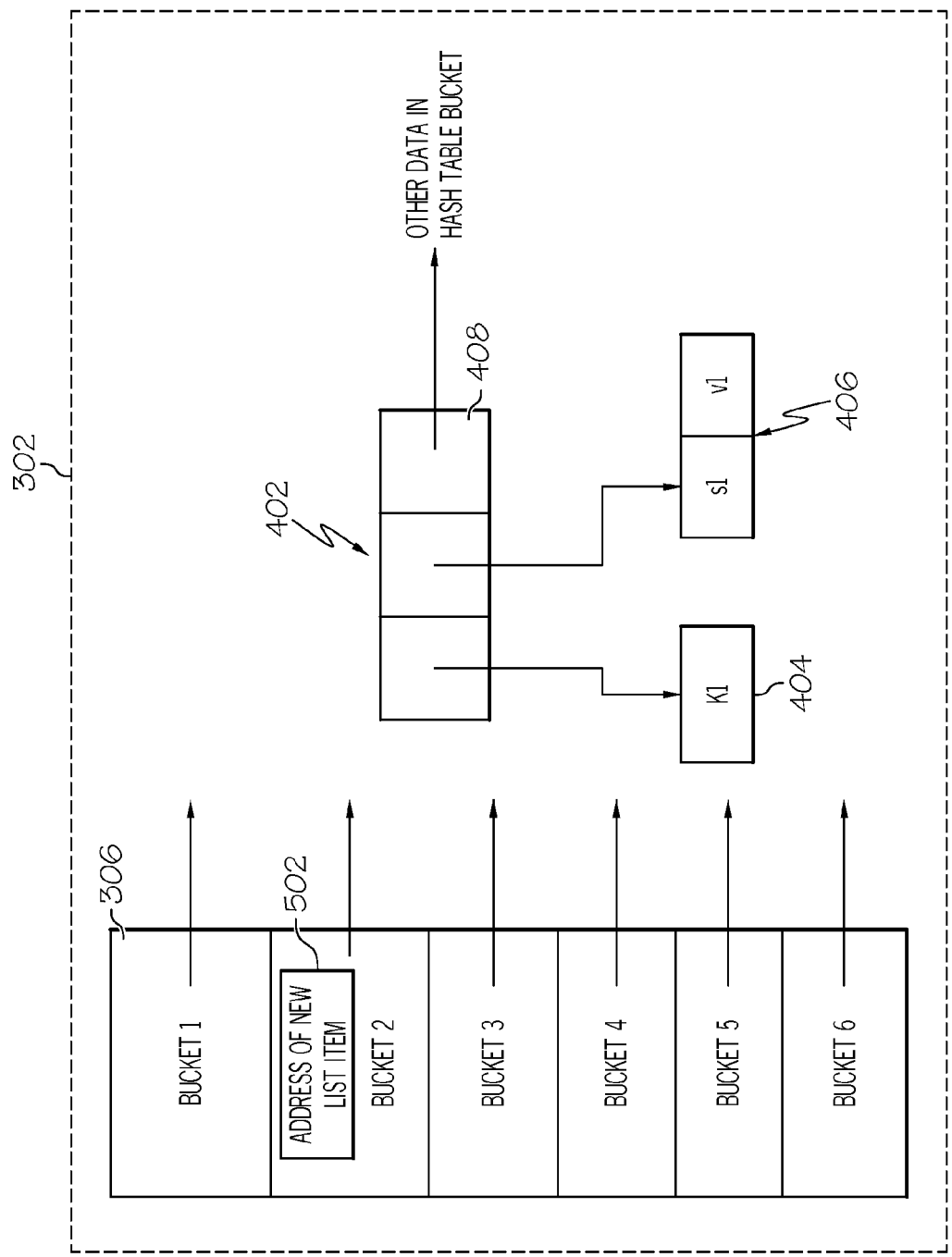
FIG. 5 illustrates one example of adding the new object of FIG. 4 to a hash table bucket according to one embodiment of the present invention.

The new information for $O_1$ is placed at the beginning of the list corresponding to the hash table bucket. Therefore, the pointer 408 to the next item in the list points to the beginning of the current hash table bucket list as shown in FIG. 4. Note that the new data structures 404, 406 for $O_1$ are not yet accessible from the hash table 302. Next, the new data structures 404, 406 for $O_1$ are made accessible from the hash table 302 by storing the address 502 of the new list item 402 as the new first element in the hash table bucket 306 corresponding to $O_1$ as shown in FIG. 5. Object $O_1$ is now accessible by reader caches 208, 210, 212 that can read the hash table 302. The process of storing the data structure for $O_1$ as the new head of the hash table bucket list could be performed atomically. Therefore, a reader cache 208, 210, 212 does not see an intermediate version of a pointer update that comprises inconsistent information.

Another type of update operation that the system 200 might need to perform is to change the value of an object associated with a key $K_1$. In order to perform this process, the writer cache 206 performs an atomic update of the size and value fields for the object corresponding to $K_1$. One method for atomically updating the size and value of the object corresponding to $K_1$ is to create a new data structure comprising the new size and value (note in FIG. 3 how the size and value are stored in a single data structure with a pointer to the data structure). The new size and value are not accessible to reader caches 208, 210, 212 until a pointer to them from the data structure corresponding to $K_1$ (marked size/value pointer in FIG. 3) is atomically updated to point to the new size/value data structure corresponding to key $K_1$. Therefore, atomic updates of pointers allow one or more embodiments to achieve consistent updates without requiring locks.

It may be desirable to keep the old size/value pair around after the update has taken place. This would be true if one or more existing processes have pointers to the old value. After it is determined that these processes have either terminated and/or no longer need access to the old value, memory space for the old data can be reclaimed.

Another type of update operation that the system 200 might require is to delete an object from the shared memory 204. The writer cache 206 deletes a cached object with key $K_1$ by finding the list item $L_1$ corresponding to $K_1$ (which comprises pointers to the data structure for $K_1$ as well as to the data structure containing the size/value). The list item $L_1$ is removed from the hash table bucket list by atomically modifying a pointer. More specifically, the pointer to $L_1$ in the list is atomically modified to point to the element after $L_1$ (which would be null if $L_1$ is the last item in the list).

The data structures comprising $K_1$ and the size/value of the data associated can be subsequently reclaimed. It may be desirable to keep one or more of these data structures around after the cached object has been removed from the hash table. This would be true if one or more existing processes have pointers to the old value (and/or old key). After it is determined that these processes have either terminated and/or no longer need access to one of the old data structures, memory space for the old data structure can be reclaimed.

Both the reader caches 208, 210, 212 and the writer cache 206 look up values corresponding to keys by searching the hash table 302. Reader caches 208, 210, 212 (as well as the writer cache 206) have the ability to read the hash table 302. Using the lock-free embodiment discussed above locks are not required to read from the cache 204 or to update the cache 204.

If the system 200 does not have the ability to atomically update a pointer, it may be necessary to use some locking to avoid inconsistencies. One option is to use a single global lock that locks the entire cache. Any process that wants to read or write to the shared memory cache obtains a global lock. Only one process is allowed to access the global lock at a time. This reduces concurrency too much because only a single process can access the cache at a time and is often unacceptable.

A better solution is to use multiple locks that have finer granularity. For example, each hash table bucket can have a lock. Each process that wants to read or write to the cache obtains a lock on the appropriate hash table bucket before it can do so. A potential problem with this solution is that when the number of hash table buckets is large, the number of locks becomes large as well. Locks can consume significant system resources. Furthermore, the system might allow only a limited number of locks. Having a lock for each hash table bucket might consume too many system resources and/or result in too much overhead.

One or more embodiments overcome these problems as follows. Let num_locks be the maximum number of locks that the system can efficiently support for locking the hash table 302. If num_locks is greater than or equal to the number of hash table buckets, then a separate lock is assigned to each bucket 304 of the hash table 302. A process obtains the lock on a hash table bucket before it can search the list corresponding to the bucket to read or write to the cache. There are several implementations of locks that can be used. These include, but are not limited to, semaphores and mutexes.

If num_locks is less than the number of hash table buckets (a quantity subsequently referred to as "hash_table_size"), then a single lock can be assigned to multiple hash table buckets. The following approaches can be used to share locks among hash table buckets. (1) Simple assignment: The system 200 assigns a lock to every hash_table_size/num_locks buckets (this number has to be rounded to an integer). In that way, each lock is assigned to the same number of buckets (modulo a difference of 1 due to rounding errors). (2) Adaptive assignment: The system 200 profiles how frequently different hash table buckets are accessed. This may vary over time. Based on this information, it adaptively varies the assignment of locks to hash table buckets. The initial assignment can be (but is not required to be) the simple assignment scheme just mentioned.

A key aspect of adaptive assignment is to balance workload among different locks. If the system 200 has some locks for which requests are almost always being held and requests are backed up waiting for them, while other locks are mostly free, this is not a good situation. If lock usage and lock waiting times are roughly similar across all locks, that is a preferable situation.

Adaptive assignment relies on collecting statistics for hash table buckets on how frequently they are searched. This can be done in the following ways. (1) For a hash table bucket, count the number of times it is accessed over a time interval. The time interval can be varied. (2) For a hash table bucket, count the total amount of time it is being accessed (e.g. total time a lock is held for accessing the hash table bucket) over a time interval. The time interval can be varied. This approach usually results in better balancing of locks than the first approach, but may require more work to implement properly. (3) Other approaches for determining how frequently hash table buckets are searched can be used within the spirit and scope of one or more embodiments of the present invention.

Using the statistics collected from the hash table buckets, the system 200 determines the expected percentage of time each lock is likely to be held (which would be the sum of the times from each bucket assigned to the lock). If the expected lock holding times are similar for the locks, then this constitutes a good assignment of locks to buckets.

On the other hand, if, for example, there is a lock $L_1$ for which the expected percentage of time for which it would be held ($P_1$) is significantly higher than the expected percentage of time ($P_2$) for which another lock $L_2$ is to be held, then one or more of the buckets currently assigned to lock $L_1$ is to be reassigned to $L_2$. This balances locking holding times more evenly among $L_1$ and $L_2$. For example, there can be a threshold $T_1$. When $P_1$ exceeds $P_2$ by at least the threshold amount then the system transfers one or more hash table buckets from $L_1$ to $L_2$.

Another embodiment estimates expected lock wait times (instead of percentage of times locks are expected to be held). In other words, for a lock $L_1$, the system 200 estimates the expected time that a process attempting to obtain $L_1$ would have to wait. Let $WT_1$ be the expected time that a process would have to wait to obtain a lock on $L_1$. Let $WT_2$ be the expected time that a process would have to wait to obtain a lock on another lock $L_2$. If $WT_1$ is significantly higher than $WT_2$, then it is more beneficial to assign one or more buckets currently assigned to $L_1$ to $L_2$ instead. For example, there can be a threshold $T_2$. When $WT_1$ exceeds $WT_2$ by at least $T_2$, the system 200 transfers one or more hash table buckets from $T_1$ to $T_2$.

Note that this approach of assigning locks to part of a data structure can be applied to other resources as well and not just to hash tables. Various embodiments of the present invention are generally applicable to distributing requests evenly to a plurality of locks when each lock is managing part of a resource. The basic principle is to modify assignments of parts of the resource to locks in order to balance requests to the locks. The resource can be a data structure. Although one or more embodiments were discussed above with respect to a hash table it should be noted that other data structures can apply as well.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
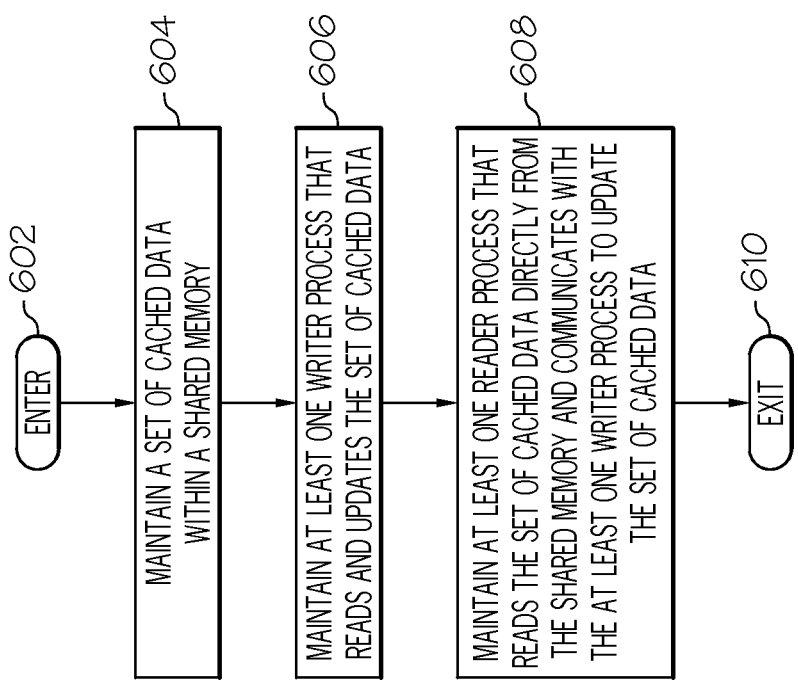
FIG. 6 is an operational flow diagram illustrating one example of caching information in a multi-process environment according to one embodiment of the present invention.
Figure 7:
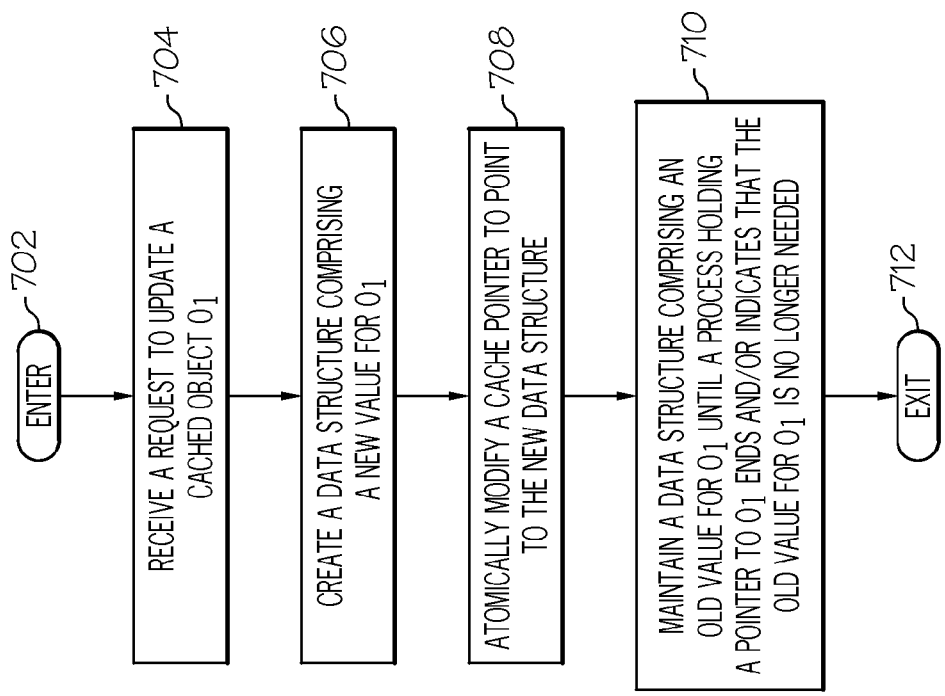
FIG. 7 is an operational flow diagram illustrating one example of allowing concurrent accesses to a shared memory cache according one embodiment of the present invention.

Referring now to FIGS. 6-8, the flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 6 is an operational flow diagram illustrating one example of caching information in a multi-process environment, as discussed above. The operational flow of FIG. 6 begins at step 602 and flows directly into step 604. The system 200, at step 604, maintains a set of cached data 202 within a shared memory 204. The system 200, at step 606, maintains at least one writer process 206 that reads and updates the set of cached data 202. The system 200, at step 608, maintains at least one read process 206 that reads the set of cache data 202 directly from the shared memory 204 and communicates with the at least one writer process to update the set of cached data 204. The control flow then exits at step 610.

FIG. 7 is an operational flow diagram illustrating one example of allowing concurrent accesses to a shared memory, as discussed above. The operational flow of FIG. 7 begins at step 702 and flows directly into step 704. The system 200, at step 704, receives a request to update a cached object $O_1$ 202. The system 200, at step 706, creates a new data structure 404, 406 comprising a new value for $O_1$. The system 200, at step 708, atomically modifies a cache pointer 408 to point to the new data structure 404, 406. The system 200, at step 710, maintains a data structure comprising an old value for $O_1$ until a process holding a pointer to $O_1$ ends or indicates that the old value for $O_1$ is no longer needed. The control flow then exits at step 712.

FIG. 8 is an operational flow diagram illustrating one example of managing concurrent accesses to a resource in a parallel computing environment, as discussed above. The operational flow of FIG. 8 begins at step 802 and flows directly into step 804. The system 200, at step 804, assigns a plurality of locks to manage concurrent access to different parts of the resource. The system 200, at step 806, monitors usage of the different parts of the source. The system 200, at step 808, modifies the assignment of locks to different parts of the resource. The control flow then exits at step 810.

Non-Limiting Examples

Although various embodiments of the invention have been disclosed, those having ordinary skill in the art will understand that changes can be made to the various embodiments without departing from the spirit and scope of the invention. The scope of the invention is not to be restricted, therefore, to the various embodiments, and it is intended that the appended claims cover any and all such applications, modifications, and various within the scope of the present invention.

Although various example embodiments of the present invention have been discussed in the context of a fully functional computer system, those of ordinary skill in the art will appreciate that various embodiments are capable of being distributed as a computer readable storage medium or a program product via CD or DVD, e.g. CD, CD-ROM, or other form of recordable media, and/or according to alternative embodiments via any type of electronic transmission mechanism.

What is claimed is:

1. A method for caching information in a multi-process environment, the method comprising:
   storing a set of data within a shared memory;
   managing a writer process that reads and updates the set of data; and
   managing a plurality of reader processes that read at least part of the set of data directly from the shared memory and send a set of update information to the writer process, and in response thereto the writer process updating the set of data stored in the shared memory based on the set of update information.

2. The method of claim 1, further comprising:
   managing, by a memory allocator, memory space within the shared memory associated with the set of data that has been stored.

3. The method of claim 1, wherein the storing further comprising:
   storing the set of data within a hash table in the shared memory.

4. The method of claim 1, further comprising:
   coordinating access to the stored set of data using at least one lock.

5. The method of claim 4, wherein the at least one lock is implemented using at least one semaphore.

6. The method of claim 1, wherein the shared memory comprises at least one shared segment.

7. The method of claim 1, wherein at least part of the set of data is accessible by multiple processes running on a node comprising the shared memory.

8. A system for caching information in a multi-process environment, the system comprising:
   a processor;
   a shared memory communicatively coupled to the processor, the shared memory storing a set of data;
   a writer process communicatively coupled to the shared memory, wherein the writer process reads and updates the set of data;
   a plurality of reader processes communicatively coupled to the shared memory, wherein each reader process in the plurality of reader processes reads at least part of the set of data directly from the shared memory and sends a set of update information to the writer process, and in response thereto the writer process updates the set of data stored in the shared memory based on each set of update information; and
   a memory allocator communicatively coupled to the shared memory, wherein the memory allocator manages memory space within the shared memory for the set of data.

9. The system of claim 8, further comprising:
   a hash table that stores the set of data in the shared memory.

10. The system of claim 8, further comprising at least one lock.

11. The system of claim 8, wherein the at least one lock is implemented using at least semaphore.

12. The system of claim 8, wherein the shared memory comprises at least one shared segment.

13. The system of claim 8, wherein at least part of the data is accessible by multiple processes running on a node comprising the shared memory.

14. A computer program product caching information in a multi-process environment, the computer program product comprising:
   a non-transitory storage medium readable by a processing circuit and storing instructions for execution by the processing circuit for performing a method comprising:
   storing a set of data within a shared memory;
   managing a writer process that reads and updates the set of data; and
   managing a plurality of reader processes that read at least part of the set of data directly from the shared memory and send a set of update information to the writer process, and in response thereto the writer process updating the set of data stored in the shared memory based on the set of update information.

15. The computer program product of claim 14, wherein the method further comprises:
   managing, by a memory allocator, memory space within the shared memory associated with the set of data that has been stored.

16. The computer program product of claim 14, the storing further comprising:
   storing the set of data within a hash table in the shared memory.

17. The computer program product of claim 14, wherein the method further comprises:
   coordinating access to the stored set of data using at least one lock.

18. The computer program product of claim 17, wherein the at least one lock is implemented using at least one semaphore.

19. The computer program product of claim 14, wherein at least part of the set of data is accessible by multiple processes running on a node comprising the shared memory.

20. The computer program product of claim 14, wherein the shared memory comprises at least one shared segment.

* * * * *